UNITED STATES PATENT OFFICE.

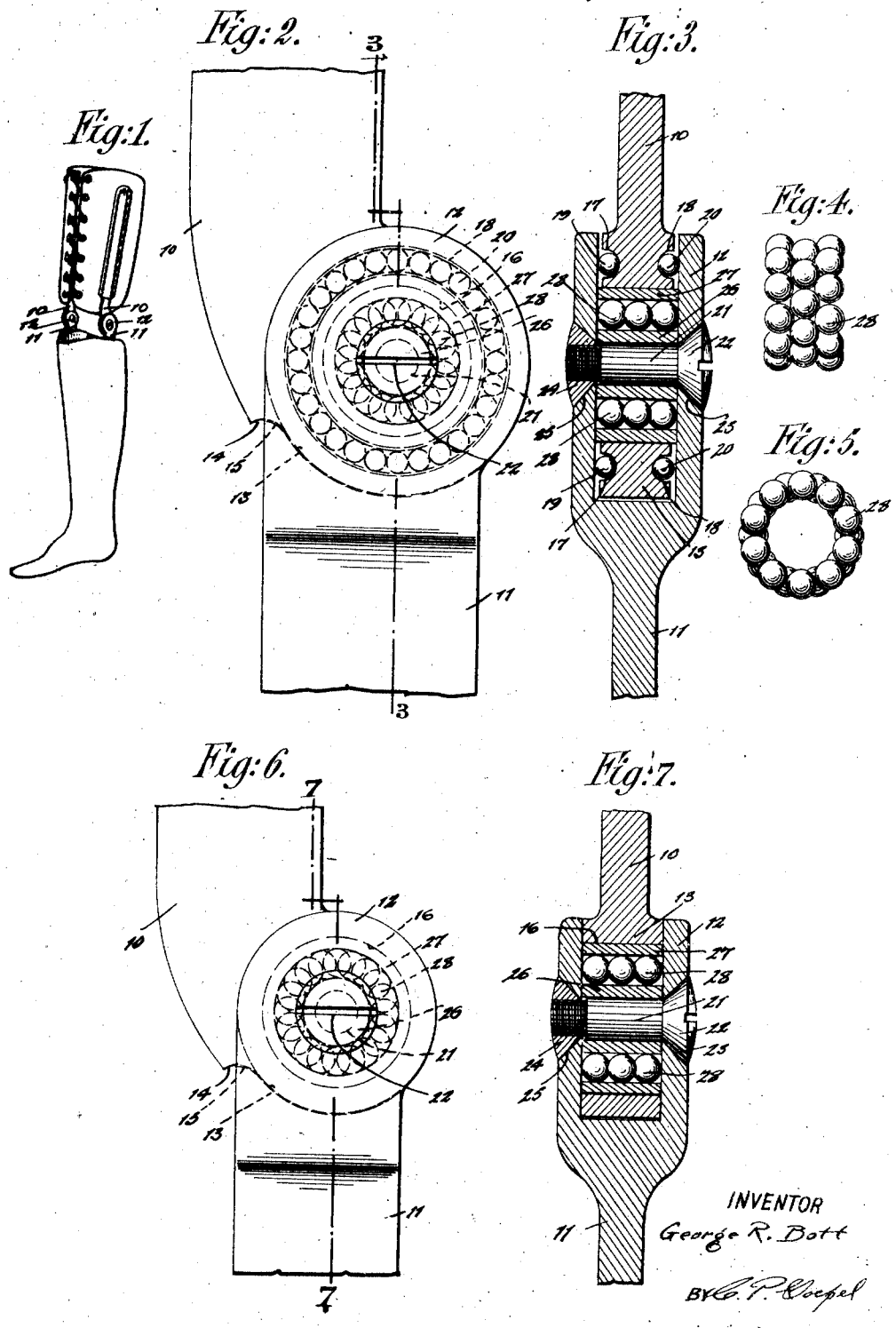

GEORGE R. BOTT, OF NEW YORK, N. Y., ASSIGNOR TO THE NORMA COMPANY OF AMERICA, OF LONG ISLAND CITY, NEW YORK, A CORPORATION OF NEW YORK.

JOINT FOR ARTIFICIAL LIMBS OR THE LIKE.

1,365,654.

Specification of Letters Patent.   Patented Jan. 18, 1921.

Application filed August 2, 1919. Serial No. 314,847.

*To all whom it may concern:*

Be it known that I, GEORGE R. BOTT, a citizen of the United States, and a resident of the borough of Manhattan, in the city, county, and State of New York, have invented certain new and useful Improvements in Joints for Artificial Limbs or the like, of which the following is a specification.

The present invention relates to improvements in joints or bearing for artificial limbs or the like, and has for an object to provide an antifriction joint which will be resistant to a relatively high degree, and will have a large load carrying capacity, the invention particularly contemplating a joint having a maximum of wearing surface to a minimum of contained volume. Further objects are to provide a joint of very simplified design and manufacture, and in which the wearing parts may be readily replaced without alteration of the other parts of the joint and in a manner as to restore the same to its original state of construction and performance.

With these and other objects in view, embodiments of my invention are shown in the accompanying drawings, and these embodiments will be hereinafter more fully described with reference thereto and the invention will be finally pointed out in the claims.

In the accompanying drawings,

Figure 1 is a perspective view of an artificial limb embodying my improved joint;

Fig. 2 is an enlarged side elevation of the joint;

Fig. 3 is a vertical sectional view taken along the line 3—3 of Fig. 2;

Fig. 4 is a side view showing the arrangement of the annular ring of antifriction balls;

Fig. 5 is an end view thereof;

Fig. 6 is a side elevation of a modified form of joint according to my invention; and Fig. 7 is a vertical sectional view taken along the line 7—7 of Fig. 6.

Similar reference characters indicate corresponding parts throughout the several figures of the drawings.

Referring to the drawings, and more particularly to Figs. 1 to 5 thereof, the embodiment of my invention shown therein comprises upper and lower attachment members 10 and 11, the lower member being forked at its upper end as at 12, the lower end 13 of the upper member fitting therein and being axially coincident therewith. Forward collapse of the two members is prevented by coöperation of the abutment shoulders 14 and 15 provided respectively thereon.

An enlarged opening 16 is provided in the lower portion 13 of the upper member 10, and annularly of the ends of the said opening there are provided in the side surfaces of the portion 13 circumferential ball race grooves 17 and 18, within which are disposed antifriction balls 19 and 20 engaging the inner surface of the forked end 12 of the lower member.

A cylindrical stud or spindle 21 extends centrally through the opening 16 in annularly spaced relation to the cylindrical wall thereof, the grooved head 22 thereof at one end being countersunk in an opening 23 at one side of the forked end 12 and having its screw threaded other end engaging a wedge nut 24 disposed in an opening 25 at the other side of the said forked end.

A tubular cylindrical bushing 26 is provided upon the stud, and in spaced relation thereto there is provided within the opening 16 a tubular cylindrical bushing 27, the said bushings abutting at their ends against the inner walls of the forked end 12, the annular portions of the said forked end surrounding the stud inclosing the ends of the opening 16. The bushing 26 is substantially tight upon the stud, while the bushing 27 is substantially tight within the opening 16, the said bushings being engaged with the respective stud and opening with a snug sliding fit so that although they are sufficiently tight as to remain substantially stationary relatively to the respective upper and lower members 10 and 11, they may at the same time be readily removed.

Within the annular space between the bushings there are interposed in staggered relation, a plurality (three in the present disclosure) of antifriction balls 28. The bushings are preferably made of bearing steel hardened and ground, their inner and outer surfaces being plain cylinders. The annular ball space is of such dimensions that the balls maintain their relation relatively to each other but are free to rotate, the end rows of balls being limited by engagement with the inner surfaces of the forked end of the lower member 11. In assembling, the outer bushing 27 is pressed into the opening 16, the inner bushing 26 placed inside the outer bushing, the space between the two bushings being then filled with grease and the balls dropped in place. After this has been done and the balls 19 and 20 inserted in the side grooves 17 and 18, the tongue end of the upper member 10 is slipped into the yoke or forked end 12 of the lower member and thereupon made secure by means of the stud and nut.

The joint according to my invention gives a maximum bearing surface and load carrying capacity for the space available, the space being a minimum in extent due to the staggering of the balls. The joint is particularly adapted to artificial limbs where a small joint is desirable and where great load carrying capacity and easy movement is essential to a perfect functioning of the joint. While the bearing is a minimum in extent due to the staggering of the balls, the wearing surface is proportionately greater according to the number of rows of balls, that is, in the present instance where three rows of balls are employed, the wearing surface is substantially three times as great as in a bearing having a single annular series of balls.

In Figs. 6 and 7 I have illustrated a modified form of construction in which the annular series of balls 19 and 20 are dispensed with, the opposed surfaces of the tongue and fork of the joint being of sufficient extent, and the support provided by the annular series of balls being such as to prevent transverse bending of the joint. Inasmuch as the annular series of balls 19 and 20 are dispensed with, the joint may be materially reduced in size, and I have shown this feature in the drawings.

I have illustrated and described preferred and satisfactory embodiments of my invention but it is obvious that changes may be made therein within the spirit and scope thereof as defined in the appended claims.

I claim:

1. In a bearing, an inner member having a plane outer cylindrical surface, an outer member concentric to said inner member and having a plane inner cylindrical surface spaced from said outer surface of said inner member, and anti-friction means disposed in said space comprising a plurality of annular rows of load sustaining balls, said rows being adjacent and contacting with each other.

2. In a bearing, an inner member having a plane outer cylindrical surface, an outer member concentric to said inner member and having a plane inner cylindrical surface spaced from said outer surface of said inner member, and anti-friction means disposed in said space comprising a plurality of annular rows being each in load sustaining position and of balls, said rows being adjacent and contacting with each other, the balls of one row being staggered relatively to the balls of the adjacent rows.

3. In a joint of the character described, a member provided at one end with an enlarged transversely disposed cylindrical opening, another member having a forked end engaging the said end of the said first mentioned member, a removable spindle engaging said member and passing axially through said opening of said first member and spaced from the wall of said opening, and a plurality of antifriction means in said space between the spindle and the wall of said opening in said first member, said antifriction means being arranged in a transverse row about and parallel with the axis of said spindle to provide a plural support for the first member upon the spindle.

4. In a joint of the character described, a member provided at one end with an enlarged transversely disposed cylindrical opening, another member having a forked end engaging the said end of the first mentioned member, a removable spindle engaging said member and passing axially through said opening of said first member and spaced from the wall of said opening, and a transverse row of independent supporting means arranged in the space between the spindle and the wall of said opening to provide intermediate and end supports for said first member upon the spindle.

5. In a joint of the character described, a member provided at one end with an enlarged transversely disposed cylindrical opening, another member having a forked end engaging the said end of the first mentioned member, a removable spindle engaging said forked end and passing axially through said opening of said first member, and spaced from the wall of said opening, a cylindrical bushing engaging said spindle the inner cylindrical surface of said first mentioned bushing being annularly spaced from the outer cylindrical surface of said last mentioned bushing, and intermediate and opposite end supporting means disposed in said space between the sides of said fork and said intermediate supporting means being adapted to engage said end supporting means for maintaining the latter in the ends of said space.

In testimony that I claim the foregoing as my invention, I have signed my name hereunder.

GEO. R. BOTT.